No. 890,755. PATENTED JUNE 16, 1908.
H. W. BOWMAN & J. W. MILLS.
OIL CAN ATTACHMENT.
APPLICATION FILED JUNE 27, 1907.

Witnesses

Inventors
H. W. Bowman
J. W. Mills,
By Dean Swift
Attorney

UNITED STATES PATENT OFFICE

HENRY W. BOWMAN AND JAMES W. MILLS, OF BARBOURVILLE, KENTUCKY.

OIL-CAN ATTACHMENT.

No. 890,755.

Specification of Letters Patent.

Patented June 16, 1908.

Application filed June 27, 1907. Serial No. 381,115.

*To all whom it may concern:*

Be it known that we, HENRY W. BOWMAN and JAMES W. MILLS, citizens of the United States, residing at Barbourville, in the county of Knox and State of Kentucky, have invented certain new and useful Improvements in Oil-Can Attachments, of which the following is a specification, reference being had therein to the accompanying drawing.

The invention relates to oil cans and the like, and has for its object to provide a simple, inexpensive and efficient device adapted to contain oil or other liquid ingredients, and which is provided with novel means for conveniently attaching a funnel thereto.

With these and other objects in view, the invention consists of the novel construction and arrangement of parts hereinafter described and shown, and particularly pointed out in the appended claims.

Figure 1:
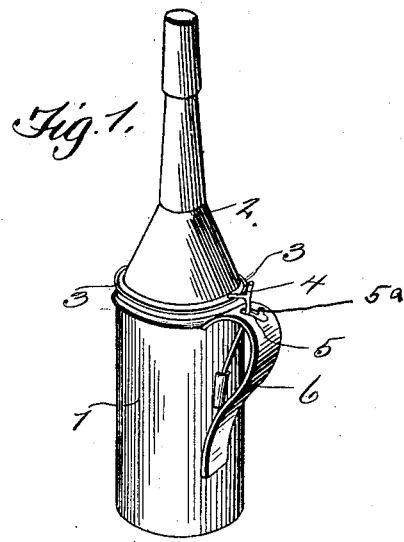
Figure 2:
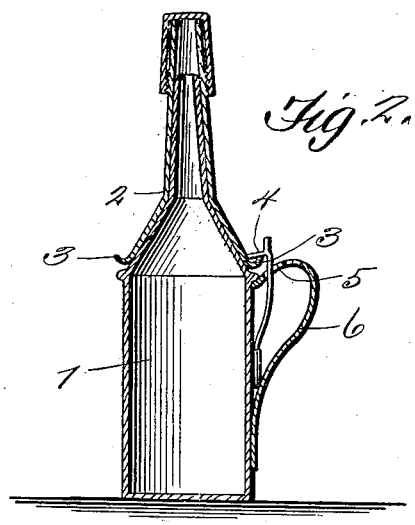
Figure 3:
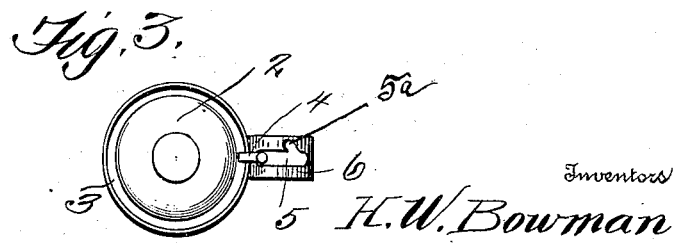

In the drawing, forming part of this specification, Figure 1 is a perspective view of a combined oil-can, and funnel, constructed in accordance with this invention. Fig. 2 is a vertical sectional view. Fig. 3 is a top plan view.

Referring to the drawings, 1 designates an ordinary oil-can on the spout of which, is mounted a funnel 2. The funnel 2, is provided with a down-turned rim 3, adapted to be engaged by a spring actuated dog or detent 4. The dog 4 is connected with the can in any suitable manner, and the upper part thereof passes through a slot 5, which is formed in the upper part of the handle 6 of the oil-can. This slot also serves as a guide for the dog. It will be seen that this funnel can be conveniently snapped on to any ordinary can and that the dog or detent will hold the same until it has been released. The slot 5, has connected with it, a recess $5^a$, which is adapted to hold the dog disengaged from the rim, when desired.

What is claimed is,

The combination of an oil-can, having a funnel mounted on the spout thereof, said funnel having a curved portion 3, a handle mounted on said can, a dog also mounted on said can, and passing upward through a slot in said handle, and adapted to engage said funnel, substantially as described.

In testimony whereof we hereunto affix our signatures in presence of two witnesses.

HENRY W. BOWMAN.
JAMES W. MILLS.

Witnesses:
BRUCE HOMES,
JOHN C. MAIN.